Feb. 4, 1958 S. C. STEPHANSON 2,821,983

EXPANDABLE BINDER FILING DEVICES

Original Filed Sept. 2, 1950 8 Sheets-Sheet 1

INVENTOR.
STEPHEN C. STEPHANSON
BY
ATTORNEY

Feb. 4, 1958 S. C. STEPHANSON 2,821,983

EXPANDABLE BINDER FILING DEVICES

Original Filed Sept. 2, 1950 8 Sheets-Sheet 2

INVENTOR.

STEPHEN C. STEPHANSON

BY Zoltan H. Polachek

ATTORNEY

EXPANDABLE BINDER FILING DEVICES

Original Filed Sept. 2, 1950 8 Sheets-Sheet 3

INVENTOR.
STEPHEN C. STEPHANSON
BY
Zoltan Polachek
ATTORNEY

Feb. 4, 1958 S. C. STEPHANSON 2,821,983

EXPANDABLE BINDER FILING DEVICES

Original Filed Sept. 2, 1950 8 Sheets-Sheet 4

INVENTOR.
STEPHEN C. STEPHANSON
BY Zoltan H. Polachek
ATTORNEY

INVENTOR
STEPHEN C. STEPHANSON
BY Zoltan H. Polachek
ATTORNEY

INVENTOR
STEPHEN C. STEPHANSON
BY Zoltan H. Polachek
ATTORNEY

INVENTOR
STEPHEN C. STEPHANSON
BY [signature]
ATTORNEY

INVENTOR.
STEPHEN C. STEPHANSON
BY
ATTORNEY 2,821,983

EXPANDABLE BINDER FILING DEVICES

Stephen C. Stephanson, New York, N. Y.

Original application September 2, 1950, Serial No. 182,961, now Patent No. 2,683,459, dated July 13, 1954. Divided and this application February 26, 1954, Serial No. 412,865

5 Claims. (Cl. 129—1)

This invention relates to new and useful improvements in expandable filing devices, and this application is a division of my Patent Number 2,683,459, dated July 13, 1954.

More particularly, the present invention proposes the construction of an expandable filing device having spaced supports between which spaced parallel straps are extended in a manner to have the material to be filed removably mounted on the straps between the supports.

Another object of the present invention proposes constructing the filing device as a stand or filing cabinet employing the basic principle of the present invention set forth in the paragraph preceding.

A still further object of the present invention proposes arranging the spaced parallel straps so that their length between the spaced supports can be varied—either increased or decreased—permitting greater amounts of material to be filed or some of the material to be removed, as desired.

A further object of the present invention proposes clips for engagement with different items to be filed—such as: relatively thin booklets, thick books, stacks of related sheets, a single sheet of paper or the like—and which in turn are removably connected with the post hangers in a manner so that the filed items can be separated from the post hangers for use independently of the filing device and related post hanger when desired.

The present invention further proposes the provision of partition sheets for independent removable mounting on the spaced parallel straps between groups of filed material falling into different classifications in a manner to separate the various groups.

It is a further object of the present invention to construct a filing device of the type described which is simple and durable and which can be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Figures 1, 5, 6, 11:
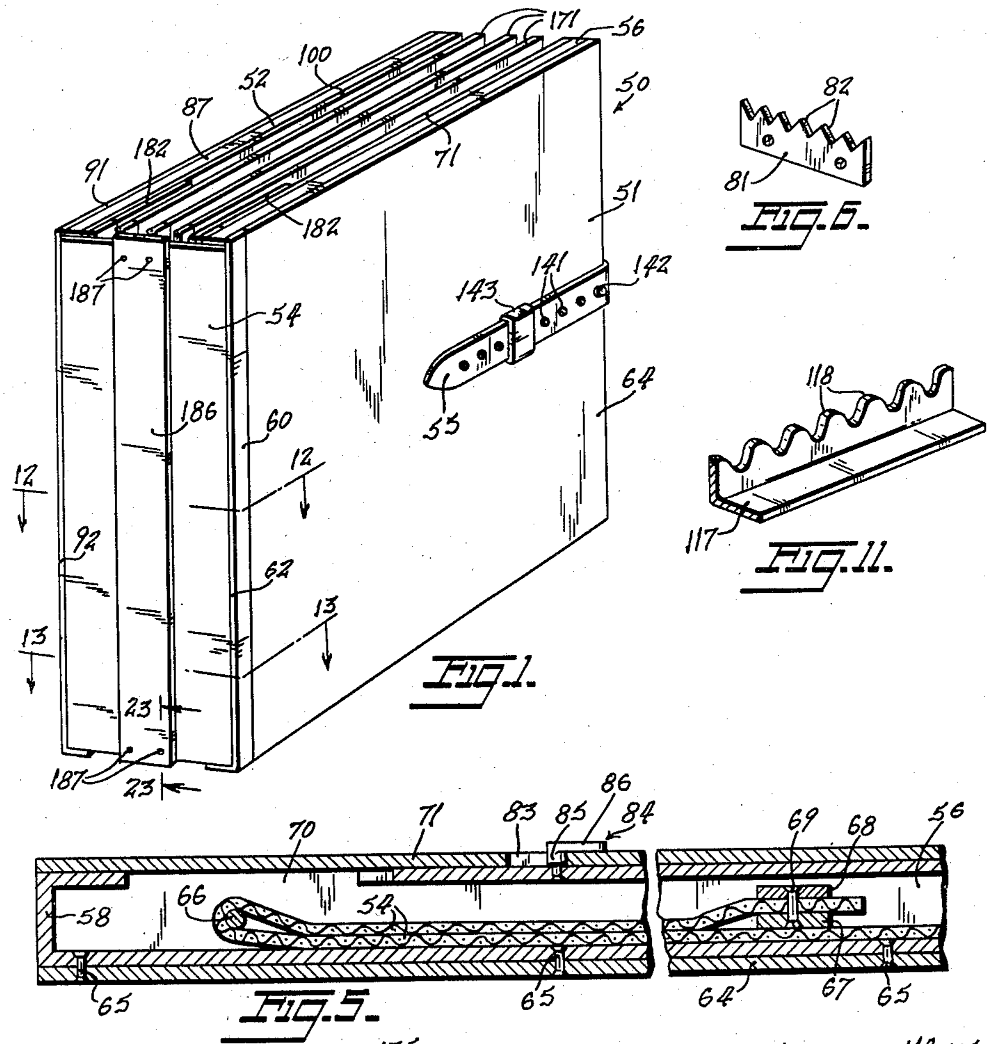
Fig. 1 is a perspective view of the filing device in the form of a book constructed in accordance with the present invention.
Fig. 5 is an enlarged partial horizontal sectional view taken on the line 5—5 of Fig. 2.
Fig. 6 is a perspective view of one of the clamp pieces used in connection with the front cover.
Fig. 11 is a perspective view of one of the L-shaped toothed bars used in the back cover.

The filing device, in accordance with the first form of the invention illustrated in Figs. 1 to 13, inclusive, is in the form of a loose-leaf book 50 having end supports in the form of a hollow front cover 51 and a hollow back cover 52. Extended between the back edges of the covers 51 and 52 there is a horizontal pair of vertically spaced straps 53, of flexible material, upon which the items to be filed are to be supported. The straps 53 are preferably formed of any durable cloth webbing or a synthetic resin. Coextensive with the straps 53 there is a back sheet 54 which extends along the outer face of and covers the straps 53, as shown in Fig. 1. The back sheet 54 is made of rubberized cloth, leather, synthetic leather or a synthetic resin in sheet form.

Also, in addition to the back sheet 54 and the straps 53, there is a binding belt 55. The belt is preferably formed of leather and is extended along the inner face of the back sheet 54 substantially midway between the straps 53. The utility of the belt 55 will become clear as this specification proceeds.

The front cover 51, as shown most clearly in Figs. 2 to 5, 12 and 13, is made of a top channel member 56, a bottom channel member 57 and vertical channel members 58 and 59 extended between the ends of the channel members 56 and 57. Adjacent ends of the channel members 56, 57, 58 and 59 are welded together and from Figs. 12 and 13 it will be noted that the channel member 59 is thinner than the other channel members. The channel member 59 is secured to the ends of the channel members 56 and 57 so that its inner face is flush with the inner face of the channel members 56 and 57. Secured to the outer faces of the channel members 56 and 57 there is an L-shaped strip of metal 60 having one of its arms 61 extended into the hollow of the front cover 51. The relationship of the L-shaped strip 60 to the narrower channel 59 is such that an opening 62 exists between the adjacent faces of those parts. From Fig. 13, it will be noted that the straps 53 and the back sheet 54 enter the hollow of the front cover 51 through the opening 62. The intermediate wall of the channel member 59 is formed with a hole 63, see Fig. 12 particularly, through which the binding belt 55 enters the hollow of the front cover 51. After entering the hollow of the front cover 51, the back sheet 54, the straps 53 and the binding belt 55 pass across the free edge of the inwardly directed arm 61 of the L-shaped strip 60 and comprises the excess of these parts for permitting the capacity of the book to be expanded.

The outer face of the front cover 51 between the L-shaped strip of metal 60 and the outer edge of the channel member 58 is closed by a plate 64 which is secured to the adjacent flanges of the channel members 56, 57 and 58 by means of rivets 65, see Fig. 5. The plate 64 is formed of metal or a suitably colored piece of synthetic resin.

Figure 3:
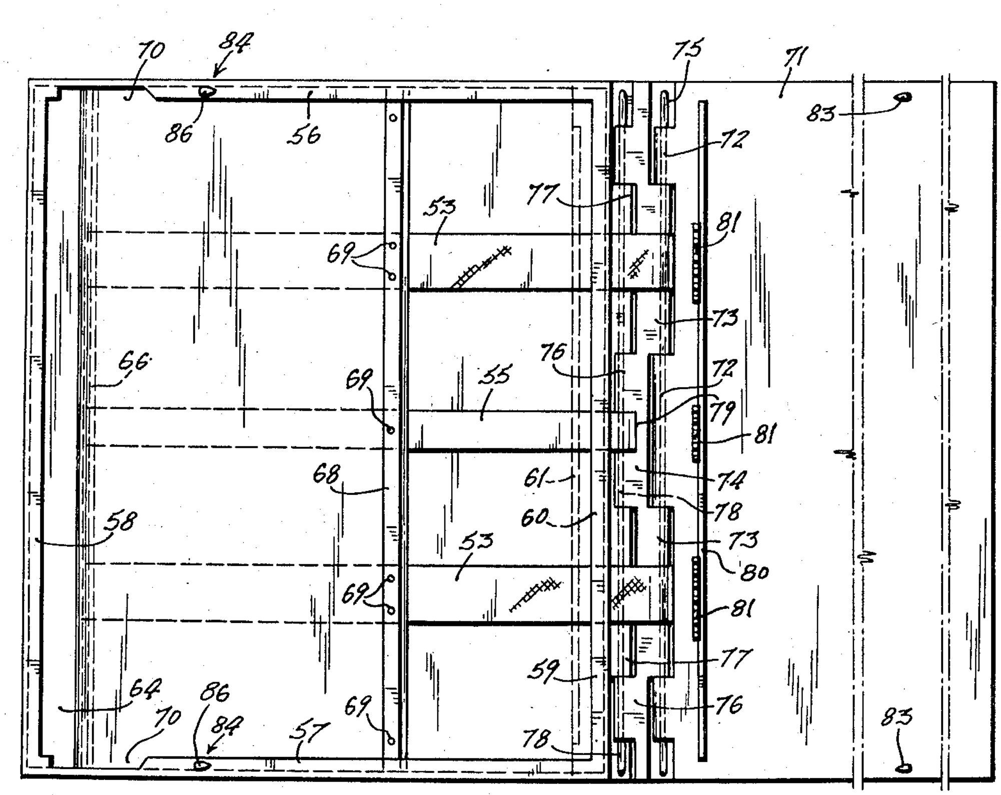
Fig. 3 is an inside elevational view of the front cover of the book with its inner cover portion in the open position.
Figures 4, 16:
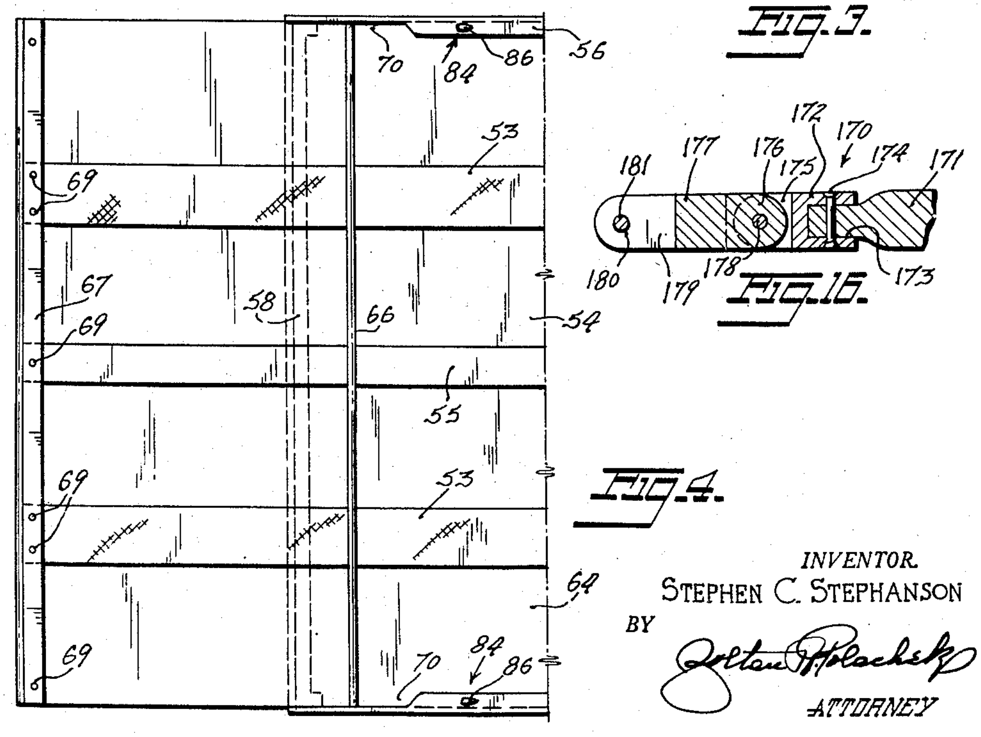
Fig. 4 is a view similar to a portion of Fig. 3, but with the reserve lengths of the back sheet and straps illustrated in their completely extended position.
Fig. 16 is an enlarged partial horizontal sectional view taken on the line 16—16 of Fig. 15.

Within the hollow of the front cover 51, the straps 53, the back sheet 54 and the binding belt 55 pass beneath a stationary rod 66, see Figs. 3 to 5. The rod 66 is fixedly mounted between the intermediate arms of the channel member 56 and 57 and is extended parallel to the channel members 58 and 59 but closely adjacent the channel member 58. The ends of the straps 53, the back sheet 54 and the binding belt 55 after passing beneath the rod 66 are secured together between super-imposed metallic strips 67 and 68. Passing through the metallic strips 67 and 68 and the back sheet 54 and particularly at the locations of the straps 53 and the belt 55 there are rivets 69 joining those parts together. The innermost flanges of the channel members 56 and 57 are formed with cutouts 70, see Figs. 3 and 5, at the ends of the rod 66. The cutouts 70 permit the ends of the metallic strips 67 and 68 and the top and bottom edges of the back sheet 54, after the straps 53, the back sheet 54 and the belt 55 have been doubled back over the rod 66, to be slipped back into the channel members 56 and 57, as shown in Fig. 3, providing a storage for the excess lengths of the straps 53, the back sheet 54 and the belt 55.

The inside face of the front cover 51 is closed by a cover plate 71 which is preferably formed of the same material used for forming the plate 64. The vertical edge of the cover plate 71 at the back of the book is formed with spaced hinge lugs 72 which are fitted into complementary hinge lugs 73 formed in a hinge strip 74. The hinge lugs 72 and 73 are pivotally connected together by means of a hinge pin 75 extended through aligned holes formed in the lugs 72 and 73. The hinge strip 74 is extended along the back or outer faces of the channel member 59, see Figs. 12 and 13, and is formed along its edge, remote from the edge formed with the hinge lugs 73, with spaced hinge lugs 76 engaged between complementary spaced hinge lugs 77 formed on the channel member 59, see Figs. 3 and 12. The hinge lugs 76 and 77 are pivotally connected together by means of an elongated hinge pin 78 passed through aligned holes formed in the hinge lugs 76 and 77. The relationship between the hinge lugs 76 and 77 is such that with the cover plate 71 in its closed position there is a clearance between the adjacent faces of the channel member 59 and the hinge strip 74, see Figs. 12 and 13 for the passage of the straps 53. Intermediate of its ends, the hinge strip 74 is formed with a cutout 79, see Figs. 3 and 12, for the passage of the binding belt 55 so that it can enter the hole 63 in the channel member 59.

Figure 12:
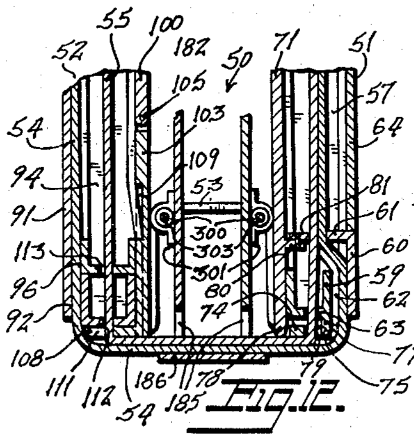
Fig. 12 is an enlarged partial horizontal sectional view taken on the line 12—12 of Fig. 1.

In alignment with the inwardly directed arm 61 of the L-shaped strip of metal 60, cover plate 71 is formed with an inwardly directed flange 80, see Figs. 3 and 12. At points aligned with the straps 53 and the belt 55, the flange 80 has secured thereto by means of rivets, short pieces of hard metal 81. The pieces of metal 81 have edges projecting beyond the free edge of the flange 80 and those projecting edges are formed with spaced teeth 82 which, in the closed position of the cover plate 71, are pressed into the surfaces of the straps 53 and the belt 55 securing those parts in position with relation to the free edge of the inwardly directed arm 61 of the L-shaped strip of metal 60. Thus, when the cover plate 71 is in its closed position, the excess lengths of the straps 53, the back sheet 54 and the binding belt 55 are locked in position within the hollow of the front cover 51.

Means is provided for releasably retaining the cover plate 71 in its closed position so that the same can be opened when desired disengaging the teeth 82 from the straps 53 and the belt 55 so that the excess lengths of the straps 53, the back sheet 54 and the belt 55 can be withdrawn from the hollow of the front cover 51 when needed. That retaining means is comprised of elongated horizontally disposed slots 83, see Figs. 2, 3 and 5, formed in the top and bottom edges of the cover plate 71 adjacent the free edge thereof. L-shaped keys 84 have neck portions 85 turnably mounted on the adjacent flanges of the channel members 56 and 57 and elongated head portions 86 at the free outer ends of the neck portions 85. The head portions 86 correspond in shape to the shape of the slots 83 in the cover plate 71. In one turned position of the neck portion 85, the head portions 86 are aligned with the slots 83 so that the cover plate 71 is free to be pivoted between open and closed positions. However, when the neck portions 85 are turned into positions in which the head portions 86 are disaligned from the slots 83, as shown in Fig. 5, the cover plate 71 will be retained in a position in which it closes the open inner side of the front cover 51.

Figure 13:
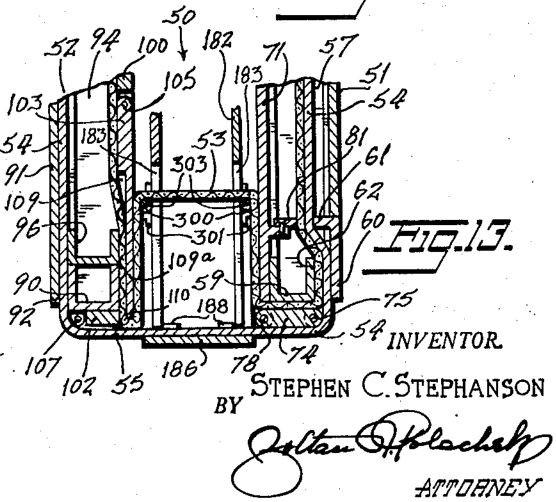
Fig. 13 is an enlarged partial horizontal sectional view taken on the line 13—13 of Fig. 1.

From the front cover 51, the straps 53, the back sheet 54 and the binding belt 55 pass across the back edges of any items inserted between the front cover 51 and the back cover 52 and then into the hollow of that back cover 52. Basically, the back cover 52 is of substantially the same construction as the front cover 51 and is comprised of a top channel member 87, a bottom channel member 88 and vertical channel members 89 and 90 extended between the ends of the channel member 87 and 88, see Figs. 7 to 13. The adjacent ends of the channel members are welded together, and as in the case of the front cover 51, the channel member 90 is thinner than the other channel members and secured to the adjacent ends of the channel members 87 and 88 with its inner flange flush with the inner flanges of the channel members 87 and 88. The outer side of the back cover 52 is closed by a plate 91 secured to the outer flanges of the channel members 87, 88 and 89 by means of rivets 92, see Figs. 8 to 10. The plate 91 is preferably made of the same material used for forming the plate 64 and the cover plate 71 of the front cover. The relationship between the plate 91 and the adjacent flange of the channel member 90 is such that an opening 92, see Figs. 12 and 13, is formed through which the back sheet 54 enters the hollow of the back cover 52.

Set into the back cover 52 there is an inner frame having channel members 93, 94, 95 and 96 extended parallel to the channel members 87, 88, 89 and 90 of that back cover. All of the channel members 93, 94, 95 and 96 are of a thickness corresponding to the thickness of the channel member 90 and have their adjacent ends welded together. Adjacent the channel member 90, the corners of the inner frame is formed with lugs 97, see Fig. 7, of a width corresponding to the spacing between the flanges of the channel member 90 which are received within the channel member 90. At its opposite corners, the inner frame is formed with outwardly directed lugs 97, see Figs. 7 and 10, which are received within complementary grooves 99 formed in the adjacent flanges of the channel members 87 and 88. The lugs 97 and 98 act to support the inner frame with the inner faces of its channel members 93, 94, 95 and 96 flush with the inner faces of the channel members 87, 88, 89 and 90, respectively, and spaced from the inner face of the plate 91.

The inner face of the back cover 52 is closed by means of a cover plate 100 formed of the same material as the plate 91. The cover plate 100 extends from the channel member 89 nearly completely to the channel member 90 and is formed along its edge adjacent the channel member 90 with spaced hinge lugs 101. An L-shaped member has one short arm 102 extended along the outer face of the intermediate arm of the channel member 90 and a long arm 103 extended along the inner face of the back cover 52 toward the adjacent edge of the cover plate 100. The edge of the long arm 103 is formed with spaced hinge lugs 104 which fit between the hinge lugs 101 of the cover plate 100. The hinge lugs 101 and 104 are formed with aligned holes through which a hinge pin 105 extends so as to pivotally connect the cover plate 100 to the long arm 103 of the L-shaped member.

The free edge of the short arm 102 of the L-shaped member is formed with spaced hinge lugs 106 which fit between complementary hinge lugs 107 formed on the channel member 90. The hinge lugs 106 and 107 are formed with aligned holes through which a pivot pin 108 extends. Thus, the inner face of the back cover 52 can be partially opened by pivoting the cover plate 100 about the hinge pin 105 or that inner face can be completely opened by pivoting the cover plate 100 with the L-shaped member about the hinge pin 107, which latter open position of the back cover is illustrated in Fig. 7.

Figure 7:
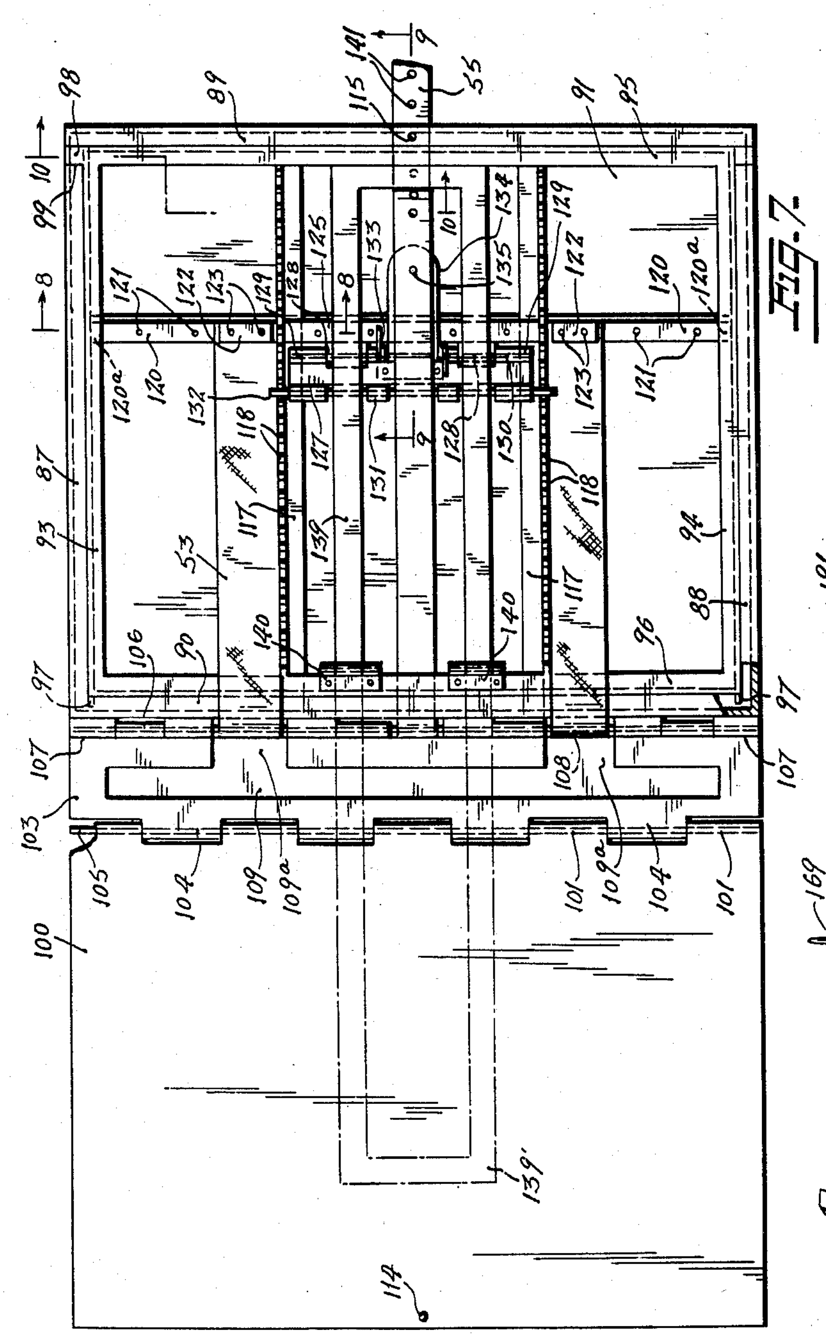
Fig. 7 is an inside elevational view of the back cover of the book with its inner cover portion in the open position.

The inner face of the long arm 103 of the L-shaped member is formed with a recess 109, see Figs. 7, 12 and 13, having extensions 109ª aligned with openings 110 formed in the junction of the long arm 103 with the short arm 102, see Fig. 13. The openings 110 together with the recess extensions 109ª and the recess 109 provide clearance for the straps 53 to enter the hollow of the back cover 52, as clearly shown in Fig. 13. As shown in Fig. 12, the short arm 102 of the L-shaped member is formed with a cutout 111 and the intermediate arms of the channel members 90 and 96 are formed respectively with holes 112 and 113 through which the binding belt 55 enters the hollow of the back cover 52.

Means is provided for retaining the cover plate 100 in a closed position with respect to the inner face of the back cover 52. This means comprises a pin 114, see particularly Fig. 9, which is mounted through the free edge of the cover plate 100. The adjacent flange of the channel member 89 is formed with a hole 115 through which the free end of the pin 114 passes in the closed position of the cover 100. Closely adjacent the inner face of the cover plate 100, the pin 114 is formed with an enlargement 116 which when forced through the hole 115 engages the inner face of that adjacent flange of the channel member 89 retaining the cover plate 100 in its closed position.

Figure 8:
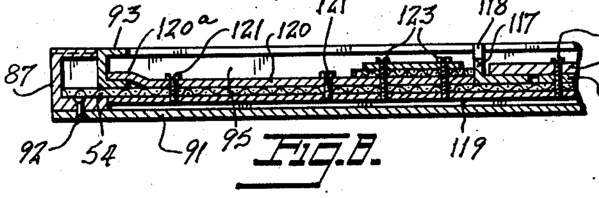
Fig. 8 is an enlarged partial vertical sectional view taken on the line 8—8 of Fig. 7.

Mounted horizontally in position between the channel members 95 and 96 of the inner frame, there are horizontal vertically spaced rack bars 117 formed of L-shaped stock. The ends of the rack bars 117 are welded to the inner edges of the channel members 95 and 96 with arms directed toward one another and arms extended toward the cover plate 100. The arms of the rack bars 117 which are directed toward the cover plate 100 are formed with rounded teeth 118, best shown in Figs. 9 and 11. The straps 53, within the hollow of the back cover 52, pass along the outer edges of the rack bars 117 and the binding belt 55 passes between the rack bars midway thereof. As shown in Fig. 8, the top and bottom edges of the back sheet 54, after entering the hollow of the back cover 52 through the opening 92, are slidably disposed between the adjacent flanges of the channel members 87 and 93 at the top of the cover and the channel members 88 and 94 at the bottom of the cover.

Within the hollow of the back cover 52, the straps 53, the back sheet 54 and the binding belt 55 are joined together at their ends as an integral unit. The joining of those parts is accomplished by a strip of metal 119, see Figs. 8 and 9, which is extended continuously along the bottom face of the back sheet 54 adjacent the end thereof. Extended along the other face of the back sheet 54, between the rack bars 117 and the channel members 93 and 94 of the inner frame, there are metal strips 120, see Figs. 7 and 8. The outer ends of the strips 120 have their end portions 120ª, see Fig. 8, bent to ride along the inner face of the flanges of the channel members 93 and 94 engaged by the back sheet 54. Screws 121 are passed through the strips 120, the back sheet 54 and threaded into the strip 119.

Superimposed on the ends of the strips 120, adjacent the outer sides of the rack bars 117 are the ends of the straps 53. Short metal plates 122 are superimposed on the ends of the straps 53 and screws 123 are passed through the plates 122, the ends of the straps 53, the strips 120, the back sheet 54 and threaded into the strip 119 to securely mount the ends of the straps 53 in position.

Between the rack bars 117, the exposed face of the end portion of the back sheet 54 has positioned thereon superimposed metal strips 124 and 125. The metal strip 124 is formed of material having the same thickness as the material of the rack bars 117 and is used as a spacer for raising the inner face of the metal strip 125 to the level of the exposed face of the inwardly directed arms of the rack bars 117. The metal strip 124 has its ends stopped short of the inwardly directed arms of the rack bars 117 and the metal strip 125 has its ends riding on the exposed faces of the inwardly directed arms of the rack bars, see particularly Fig. 8. Screws 126 are passed through the metal plates 124 and 125, through the back sheet 54 and are threaded into the metal strip 119 joining those parts together as an integral unit. Thus, the ends of the straps 53 and the back sheet 54 are joined together for unitary movement relative to the rack bars 117.

Latch means is carried by the metal strip 125, for securing the ends of the straps 53 and the back sheet 54 in desired adjusted positions with relation to the rack bars 117. The latch means is characterized by a latch plate 127 which extends along the edge of the strip 125 facing the channel member 96. The edge of the metal strip 125 is formed with spaced curled portions 128 which are received between complementary spaced curled portions 129 formed on the adjacent edge of the latch plate 127. Extended through the curled portions 128 and 129 there is a long pivot pin 130 pivotally mounting the latch plate 127 on the metal strip 125. The free edge of the latch plate 127 is formed with spaced tubular portions 131. Fixedly extended through the tubular portions 191, there is a latch bar 132, circular in cross-section, which has its ends projected beyond the outermost tubular portions 131. The projected ends of the latch bar 132 engage between the teeth 118 of the rack bars 117 and retain the straps 53 and the back sheet 54 in adjusted positions with relation to the rack bars 117.

Resilient means is provided in connection with the pivot pin 130 for urging the latch plate 127 into a pivoted position in which the ends of the latch bar 132 are retained in position between the teeth 118. That resilient means comprises a coil spring 133 which is wound on the pivot pin 130 and which has its ends bearing on the exposed faces of the metal strip 125 and the latch plate 127 urging the latch plate 127 into a position in which the ends of the latch bar 132 are engaged with the teeth 118. It being appreciated, of course, that the teeeth 118 of the rack bars 117 must be aligned for the ends of the latch bar 132 to be engaged between adjacent teeth.

Means carried by the latch plate 127 and controlled by the binding belt 55 is provided for pivoting the latch plate 127 against the action of the coil spring 133 to disengage the ends of the latch bar 132 from the teeth 118 freeing the ends of the straps 53 and the back sheet 54 to be adjusted with relation to the rack bars 117 and the back cover 52. That means is characterized by a finger 134 which is fixedly mounted at one end to the inner or bottom face of the latch plate 127 and which has its free end exposed over the coil spring 133. The free end of the finger 134 carries a headed stud 135 which is passed through a complementary hole 136, see Fig. 9, formed in the binding belt 55. The headed stud 135 functions to releasably connect the finger 134 and the binding belt 55. The finger 134 is formed of flexible material but the material used must have sufficient rigidness to overcome the action of the coil spring 133 when pressures are applied to the free end of the finger 134. From Fig. 9, where only a portion of the cover plate 100 is shown at the right-hand side of the figure, it will be noted that the finger 134 is given a natural bias to have its free end project from the open side, of the back cover 52 when the cover plate 100 is in its open position. When that cover plate 100 is closed it presses inward on the free end of the finger 134 pressing it into the hollow of the back cover 52.

From the finger 134, the free end of the binding belt 55 is again passed to the exterior of the back cover 52 through aligned holes 137 and 138 formed respectively in the intermediate arms of the channel members 89 and 95. The binding belt 55 where it passes through the holes 137 and 138 of the channel members 89 and 95, respectively, functions to retain the inner frame in position within the back cover 52. The relationship of the binding belt 55 to the finger 134 is such that when the extended end of the belt 55 is pulled a pressure will be exerted on the free end of the finger 134 to pivot the latch plate 127 against the action of the coil spring 133 and disengage the ends of the latch bar 132 from the teeth 118 of the rack bars 117. Further pulling on the end of the binding belt 55 will draw the straps 53 and the back sheet 54 further into the back cover 52 reducing the operative lengths of the straps and the back sheet between the back edges of the covers 51 and 52. When the pull on the binding belt 55 is relaxed, the coil spring 133 will function to pivot the latch plate 127 back to its starting position re-engaging the ends of the latch bar 132 with the teeth 118 of the rack bars 117 to retain the ends of the straps 53 and the back sheet 54 in their newly adjusted positions.

A U-shaped latch frame 139 has the free ends of its side arms pivotally attached to hinge plates 140 in turn secured to the exposed flanges of the channel member 96. The latch frame 139 is of a length to extend completely across the open side of the back cover 52 to the channel member 95 of the inner frame. In the operative position of the latch frame 139, illustrated by the full lines in Fig. 7, that frame extends across the latch plate 127 and is engaged by the inner face of the cover plate 100, when in its closed position as partially shown at the right-hand side of Fig. 9, to retain that latch plate in a pivoted position in which the free ends of the latch bar 132 will be retained engaged with the teeth 118 of the rack bars 117. Thus, the U-shaped latch frame 139 functions as an auxiliary to the coil spring 133 to retain the latch plate 127 in an operative position in the closed position of the cover plate 100. The inoperative pivoted position of the latch frame 139 is indicated by the dot and dash lines 139' in Fig. 7.

Figure 9:
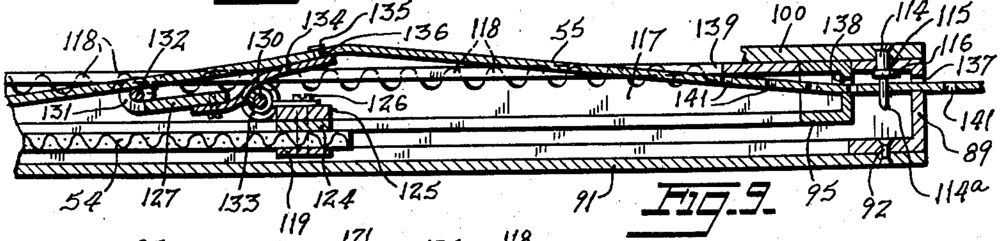
Fig. 9 is an enlarged partial horizontal sectional view taken on the line 9—9 of Fig. 7.

The free end of the binding belt 55 is formed with a line of spaced perforations 141 and the pin 114 carried by the cover plate 100, is formed with a pin-like extension 114[a], see particularly Fig. 9, which in the closed position of the cover plate 100, is extended through one of the perforations 141 to secure the binding belt in the desired adjusted position of the latch plate 127. In the closed position of the book 50, the free projected end of the binding belt 55 is engaged about the free edges of the covers 51 and 52 and a headed pin 142 mounted on the outer side of the front cover 51 is passed through one of the perforations 141. From there the free end of the binding belt 55 is slipped through a loop 143 mounted on the outer face of the cover 51 rearward of the headed pin 142. Thus, the binding belt 55 is also used for securing the book 50 in a closed position and, if desired, any known type of lock can be provided in connection with the projected free end of the binding belt 55 for locking the book in its closed position.

When the spacing between the covers 51 and 52 is small, as when there are few inserts between the adjacent faces of those covers, the free end of the belt 55 may be too long and unwieldy if that belt is made of one continuous length, long enough to engage about the book when the covers are expanded to their maximum as controlled by the operative lengths of the back sheet 54 and the straps 53. To overcome that difficulty the binding belt can be made, if desired, of several end aligned sections with the ends of those sections joined together by suitable splicing or lacing so that some of the sections can be removed to reduce the operative length of the binding belt when the spacing of the covers is small.

It is believed that from the foregoing description the method of adjusting the position of the exposed lengths of the straps 53 and the back sheet 54 between the back edges of the covers 51 and 52 will be evident. However, it is pointed out that the toothed pieces of metal 81 and the inwardly directed arm 61 of the L-shaped strip of metal 60, of the front cover 51, provide a coarse adjustment whereby the reserve lengths of the straps 53 and the back sheet 54 can be extended or absorbed, as desired. On the other hand, the latch plate 127 and related mechanism of the back cover 52 provides a means whereby the operative lengths of the straps 53 and the back sheet 54 can be adjusted within very small degrees to obtain the desired positioning of the covers 51 and 52 with relation to each other.

In Figs. 2 and 17 to 21, there are illustrated details of the post hangers which are used for mounting the articles to be filed in position on the straps 53 and between the adjacent faces of the covers 51 and 52. Each of the post hangers is formed of a relatively thin strip of metal 144 which is somewhat flexible although it need not be flexible. Extended inward from the back edge of the strip of metal 144 there is a spaced cutout 145 which continues at its top edge into an upwardly extended recess 146. The recess 146 is located midway of the side of the metal strip 144 dividing off a downwardly projected finger 147. The cutout 145 is sufficiently wide to permit the strap 53 to be passed therethrough to be aligned with the recess 146 after which the metal strip 144 can be moved downward to dispose the strap 53 within the recess 146 and in front of the finger 147, as shown in full lines in Fig. 2 and in dot and dash lines in Fig. 17. The strap 53 can, if desired, be made smooth and be reinforced by the application of resinous material to the top and bottom edges thereof so that the post hangers will have free movement along the lengths of those straps.

Means is provided for closing the entrance to one of the recesses 146 so as to retain the straps 53 in position within the recesses and so releasably retain the post hangers in position on the straps 53. As shown on the drawing, the closure means is arranged in connection with the bottommost recess 146 and is comprised of a lock blade 148 pivotally mounted intermediate of its ends on the bottom end portion of the strip of metal 144, by means of a pivot pin 149. The lock blade 148 has one end portion curved to extend across the mouth of the recess 146 and its other end reduced and extended toward the bottom end of the metal strip 144. A leaf spring 150 has its intermediate portion curled about the pivot pin 149 with one end engaged through a small hole 151 formed in the metal strip 144. The other end of the spring 151 is curled about the adjacent side edges of the lock blade 148 and the metal strip 144 for retaining the lock blade 148 in which its upper curved end portion blocks the entrance to the recess 146. A pin 152 pivotally mounts an operating cam 153 on the bottom end of the metal strip 144 immediately adjacent the reduced bottom end portion of the lock blade 148. The operating cam 153, at its bottom end, has a small finger 154 projected beyond the bottom end of the metal plate 144 by which a finger grip can be had on the cam 153 for pivoting the same. When the cam 153 is pivoted it in turn pivots the lock blade 148 against the action of the leaf spring 150 and disengages the upwardly curved end portion of the lock blade from the recess 146 so that the respective strap 53 can have free ingress and egress from that recess. When the cam 153 is pivoted through ninety degrees from the position shown in Figs. 17 and 18, the upper flat end portion of that cam will then function to hold the lock blade, against the action of the leaf spring 150 in an inoperative position until that cam is swung back to its starting position.

Similarly, the front edge of the metal strip 144 has a cutout 155 which continues at its bottom into a downwardly extended recess 156. The recess 156 is located midway of the width of the metal strip 144 dividing off a finger 157 which is extended upward to receive a clip, to be hereinafter described carried by the respective article to be filed. The cutout 155 and recess 156 are arranged out of horizontal alignment with relation to the cutouts 145 and recess 146 so that the metal strip 144 can be made of a narrow strip of metal.

Means is provided for obstructing the free end of the finger 157 so as to retain the clip in position on the finger. The obstructing means includes an elongated lock strip 158 formed at its bottom end with a laterally extending portion 159 which is pivoted to the metal strip 144 between the adjacent fingers 147 and 157 by means of a pin 160. Intermediate of its ends, the lock strip 158 is formed with a laterally extending projection 161 which engages the free end of the respective finger 157 to retain the clip from sliding therefrom.

A spring 162 has an intermediate portion coiled about the pivot pin 160 and one end portion bent about the front edge of the metal strip and its other end portion bent about the back edge of the metal strip 144 and the adjacent edge of the lock strip 158. The spring 162 functions to hold the lock strip 158 in its operative position with the projection 161 engaging the free end of the respective finger 157.

Pivotally mounted on the upper end portion of the strip of metal 144 adjacent the free end of the lock strip 161 there is an operating cam 163. The cam 163 is pivotally retained in position on the upper end portion of the strip of metal 144 by means of a pivot pin 164. The top of the cam 163 is formed with an upwardly extended finger 165 which projects above the top end of the metal strip 144 providing a finger grip by which the cam can be pivoted. When the cam 163 is pivoted, it in turn pivots the lock strip 161 disengaging it from the free end of the respective finger 157. When the operating cam 163 is pivoted through ninety degrees its flat bottom end will function to hold the lock strip 161 in its inoperative position in which the free end of the finger 157 will be unobstructed.

Figure 2:
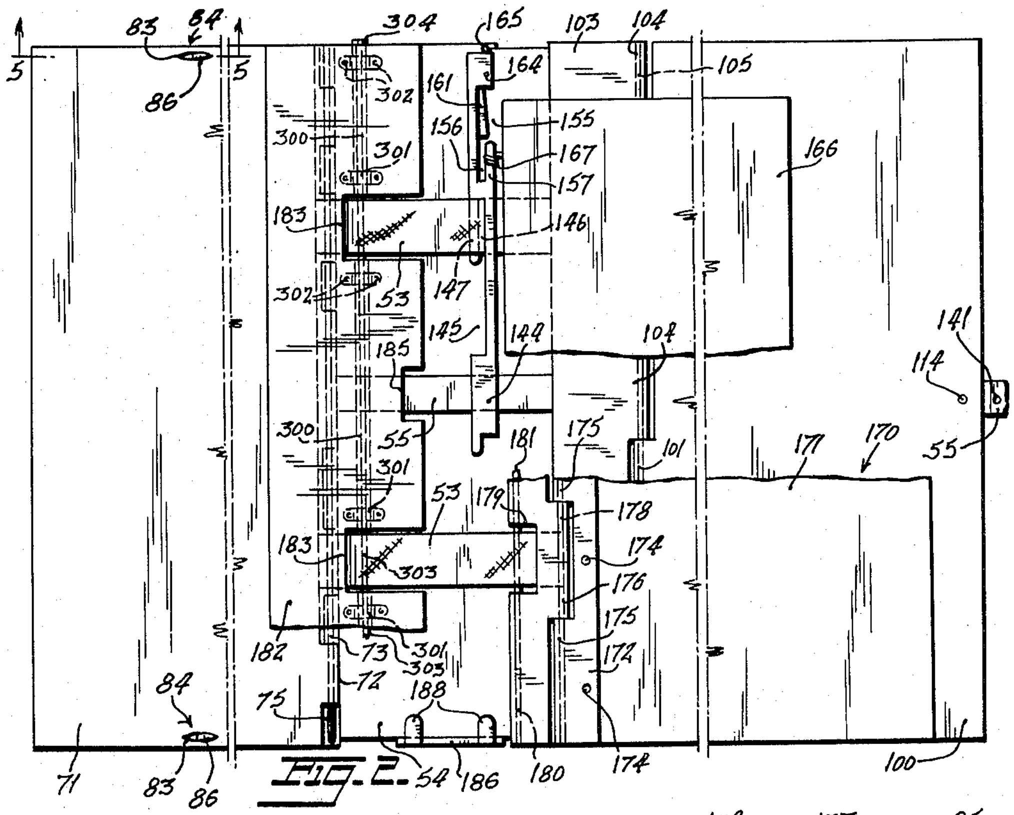
Fig. 2 is a plan view of the book in open condition with parts of the inserts broken away to reveal interior constructions.
Figure 10:
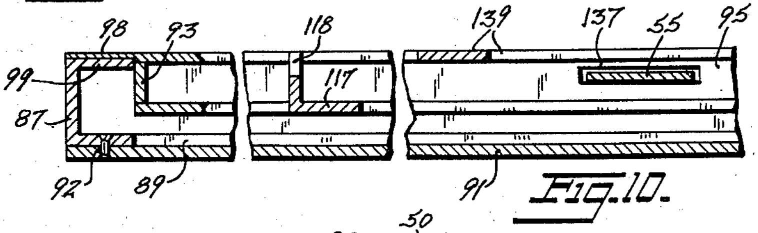
Fig. 10 is an enlarged partial vertical sectional view taken on the line 10—10 of Fig. 7.
Figure 22:
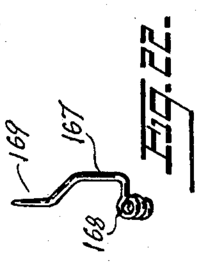
Fig. 22 is a perspective view of the clip used in Fig. 17 for attaching the item to be filed to the post hanger.
Figure 21:
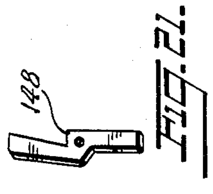
Figs. 19 to 21 are perspective views of some parts used in making the post hanger.
Figures 14, 15, 17, 19, 20:
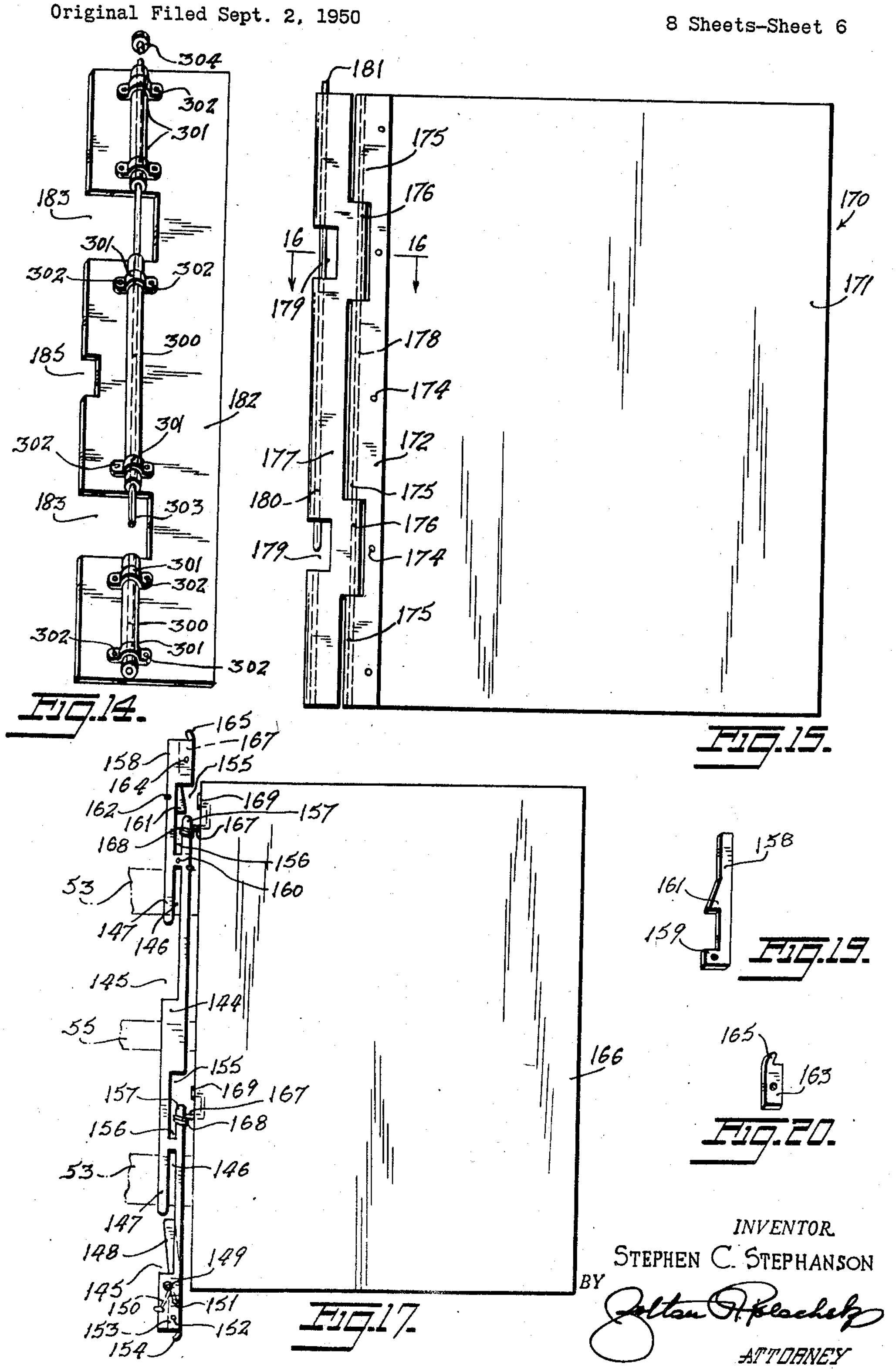
Fig. 14 is a perspective view of one of the tension adjuster members used in the first form of the invention.
Fig. 15 is an elevational view of one of the partition sheets of the present invention.
Fig. 17 is an elevational view of one of the post hangers with an item to be filed mounted in position thereon.

In Figs. 2 and 17, the filed item 166 is in the form of a thin pamphlet and is provided along its back edge with spaced clips 167 which are properly spaced to be received over the fingers 157. Each of the clips 167 is formed of a piece of relatively stiff wire has one end portion bent into a coil 168 to be slipped over the free end portion of the respective finger 157. The other end portion of the piece of wire has a point 169 and is bent to be extended into and then out of the back of the pamphlet, as shown in Figs. 2 and 17. The formation of the clip 167 is best illustrated in Fig. 22. With the coil 168 engaged upon the finger 157, as shown in Figs. 2 and 17, and the lock strip 161 in its operative position obstructing the free end of the upper finger 157 it will be appreciated that the pamphlet will be retained in position on the post hanger. If the post hanger is then engaged with the strap 53, the pamphlet will then be removably filed between the adjacent faces of the covers 51 and 52 of the book. The use of the clip 167 provides a ready means by which the filed item 166 can be removed from the post hanger for use outside of the book, without removing the post hanger from the strap 53 so that the post hanger marks the place where the item is to be returned to the book. At the same time, the complete assembly including the post hanger can be separated from the straps 53 when the filed item is to be removed from the file to be discarded or for other reasons.

Provided to be removably mounted on the straps 53 between different groups of articles filed in the book 50, there are partition sheets 170 illustrated in detail in Figs. 2, 15 and 16. The partition sheets 170 are provided to separate the different groups of items filed in the book 50 and each is comprised of a main body portion 171 formed of heavy cardboard, synthetic resin material or metal and can be inscribed on the face thereof or have secured to the face thereof a label carrying an inscription as to the nature of the items which follow that particular partition sheet in the book 50. Whether the face of the main body portion 171 is inscribed directly or has a label secured thereto will depend on the nature of the material used to form the main body portion.

A strip of metal 172 is formed along its one vertical edge with a groove 173, see particularly Fig. 16, into which the adjacent edge of the main body portion 171 is received. Spaced rivets 174 are engaged through the main body portion 171 and the strip of metal 172 joining those parts together. The other vertical edge of the metal strip 172 is formed with spaced hinge lugs 175 between which there are received spaced hinge lugs 176 formed on a second metal strip 177. The hinge lugs 175 and 176 are formed with aligned holes for the passage of a pivot pin 178 to pivotally interconnect the metal strips 172 and 177. If the main body portion 171 is formed of metal or synthetic resin, there is no need for using the metal strip 172, as the back edge of the main body portion can be hinged directly to the metal strip 177.

The back edge of the metal strip 177 is formed with cutouts 179 which are properly spaced to receive the straps 53, as shown in Fig. 2. Closely adjacent the back edge, the metal strip 177 is formed with a tubular passage 180 which traverses the cutouts 179 closely adjacent their mouths or open sides. A long pin 181 is slidably and axially removably received within the passage 180 for engaging behind the straps 53, see Fig. 2, with those straps in position in the cutouts 179 for mounting the partition sheets 170 removably in position on those straps. When the pin 181 is axially slid from the tubular passage 180, the partition sheet 170 is free to be removed from the straps 53, through the open sides of the cutouts 179.

Also, positioned on the straps 53, between the inner faces of the covers 51 and 52 of the book and the articles filed therein, there are strap tensioning panels 182. Details of the construction of the panels are shown in Fig. 14 and the position of those panels on the straps 53 is illustrated in Figs. 2, 12 and 13. In the latter figures, the filed items have been omitted for the sake of clarity, but it is appreciated that those items will be in the space between the adjacent faces of the panels having particular regard for Figs. 12 and 13. The tensioning panels 182 are formed of metal or synthetic resin material and are provided substantially midway of their sides with cutouts 183 through the inner ends of which the straps 53 pass, as shown in Figs. 2 and 13. Between the cutouts 183 and at a point aligned with the binding belt 55, the back edge of the panels 182 are formed with cutouts 185 through which the belt 55 passes, as shown in Figs. 2 and 12.

Means is provided for releasably retaining the tensioning panels 182 in position on the straps 53. The releasably retaining means is characterized by end aligned tube sections 300 which are positioned against the one face of each of the panels 182 on opposite sides of the cutouts 183. The tube sections 300 are retained in position by means of straps 301 mounted in position over the tube sections 300 and secured in position on the panels by means of rivets 302. Slidably extended through the tube sections 300 there is a long pin 303 which is passed behind the straps 53 mounting the panels 182 in position thereon. At one end, the pin 303 is provided with an enlarged head 304 by which a grip can be had on the pin for pulling the same out of the tube sections 300 to free the panels 182 from the straps 53 for removal when desired. By this construction, the panels 182 can be easily removed from the straps 53, and, if desired, additional panels can be inserted between the adjacent faces of the filed articles at any position along the lengths of the straps 53 in the completely expanded position of the book.

When the book 50 is closed with filed items in position on the straps 53, the back edges of the tensioning panels 182 engage the inner faces of the back sheet 54, as shown in Figs. 12 and 13 and push forward on the straps 53 properly tensioning those straps between the back edges of the front cover 51 and the back cover 52. Those panels 182 serve to rigidly retain the straps in position and so retain the filed items from shifting their positions relative to one another and to the covers while the book is being carried about in its closed position.

Extended vertically along the outer face of the back sheet 54 between the rear edges of the covers 51 and 52, there is a vertically extended tablet member 186. The tablet member 186 is formed of resinous plastic material or other material upon which notations regarding the contents of the book 50 can be inscribed. Secured to the top and bottom edges of the tablet member 186, by means of rivets 187, there are spaced metal clips 188, see particularly Fig. 23. The clips 188 are of U-shaped configuration with their open sides directed toward one another so that they can be slipped over the top and bottom edges of the back sheet 54. The clips 188 permit the tablet member 186 to be slid along the operative length of the back sheet 54 so that the tablet member can always be positioned midway between the back edges of the covers 51 and 52 regardless of the spacing of those covers. With the face of the tablet member 186 inscribed with a notation regarding the contents of the book, the proper book can be quickly identified when a number of books are positioned side by side on a shelf.

It is believed that the manner of using the filing book of the present invention will be self-evident from the foregoing description without a detailed explanation of the operation. From the explanation, it is apparent that there has been provided a convenient book-type filing device in which the operative content space is only limited by the lengths of the straps 53, the back sheet 54 and the binding belt 55 and which content space can be quickly increased and decreased in size as the contents may require, without the use of any tools. Furthermore, the binder provides a novel means for filing any type of fluctuating records as each item is easy to insert and is held securely in place and each can be easily removed without disturbing any of the other filed items.

Figure 24:
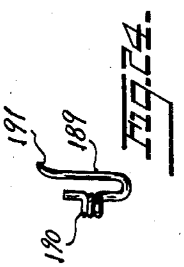
Fig. 24 is an elevational view of another type of clip which can be used for attaching the item to be filed to the post hanger.

In Fig. 24, there is illustrated another type of clip 189 which can be used with the post hanger illustrated in Figs. 17 to 21 for filing booklets or other similar thick items. The clip 189 is formed of a U-shaped piece of relatively stiff wire and has one of its arms formed with a coil 190 for engagement with one of the fingers 157 of the post hanger. The other arm of the clip 189 has a pointed end 191 to be inserted into the bound back of the booklet.

Figure 25:
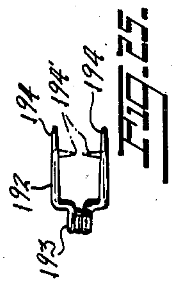
Fig. 25 is a view similar to Fig. 24, but illustrating still another type of clip which can be used for attaching the item to be filed to the post hanger.

Fig. 25 is a side elevational view of still another modified type of clip 192 which is to be used with the post hanger illustrated in Figs. 17 to 21 for filing booklets. The clip 192 is also formed of a U-shaped piece of wire and has its intermediate arm formed with a vertically disposed coil 193 for engagement with the finger 157 of the post hanger. The side arms of the clip have pointed ends 194. With the clip 192 held with the side arms superimposed one above the other, the pointed ends 194 can be pressed horizontally into the back of the booklet after which the pointed ends are bent toward one another, as indicated by the dot and dash lines 194' in Fig. 25, to retain the clip 192 from being pulled from the booklet. The coil 193 can then be engaged with the desired finger 157 of the post hanger.

Figures 18, 23, 26, 27, 28, 29, 30, 31, 32, 33, 34, 35, 36, 37:
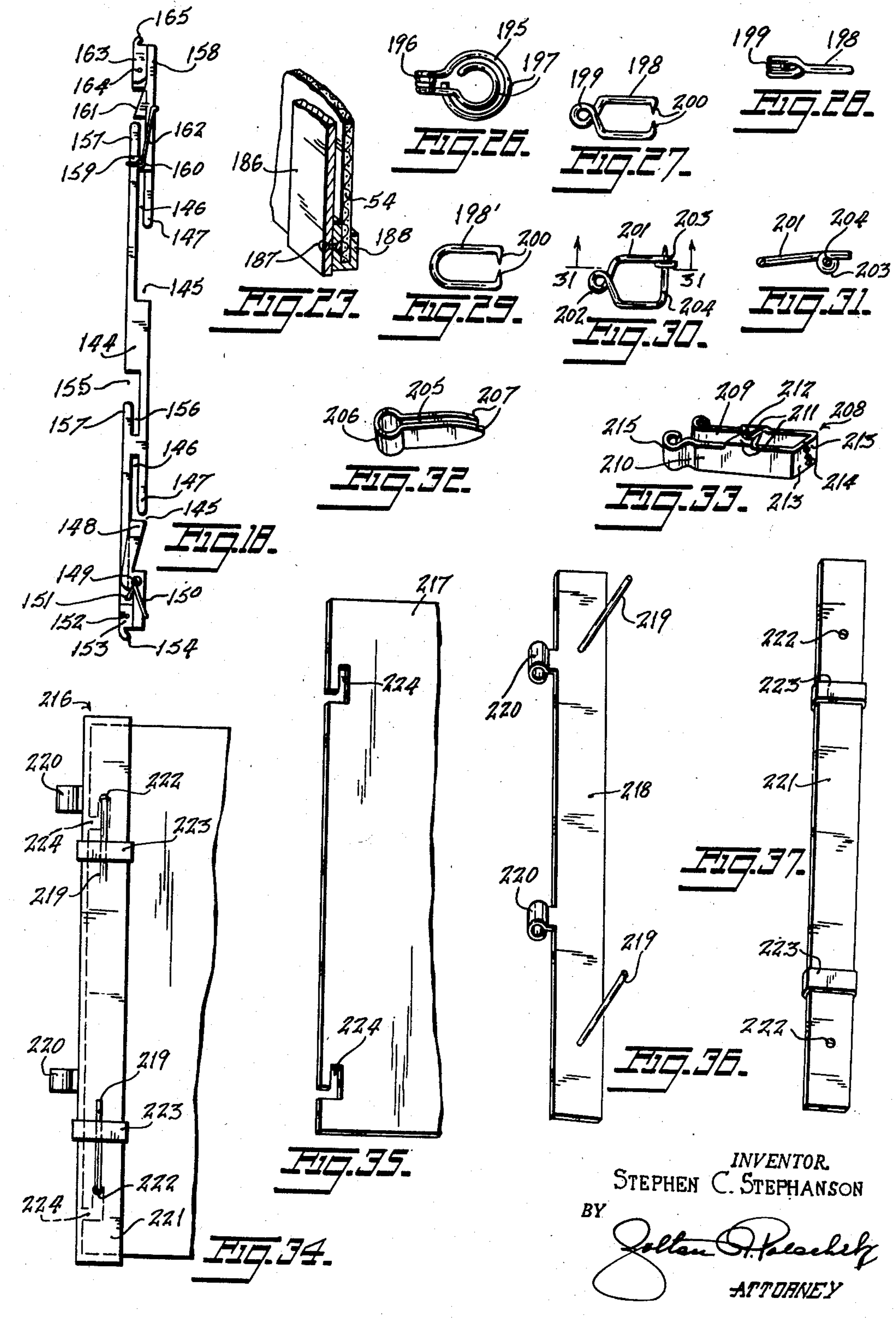
Fig. 18 is an elevational view of the reverse side of the post hanger shown in Fig. 17.
Fig. 23 is an enlarged partial vertical sectional view taken on the line 23—23 of Fig. 1.
Fig. 26 is an elevational view of still another form of clip which can be used for attaching the item to be filed to the post hanger.
Fig. 27 is a plan view of a still further form of clip which can be used for attaching the item to be filed to the post hanger.
Fig. 28 is a side elevational view of the clip shown in Fig. 27.
Fig. 29 is a plan view of still another form of attaching clip.
Fig. 30 is a plan view of an attaching clip in accordance with a further modification of the present invention.
Fig. 31 is a sectional view taken on the line 31—31 of Fig. 30.
Fig. 32 is a perspective view of an attaching clip in accordance with another modification of the present invention.
Fig. 33 is a perspective view of still another modified form of attaching clip.
Fig. 34 is an elevational view of a modified type of attachment for removably mounting a single sheet in position on the post hanger.
Fig. 35 is a partial perspective view of the sheet of Fig. 34 showing the punchings.
Fig. 36 is a perspective view of the bottom plate forming a part of the attachment shown in Fig. 34.
Fig. 37 is a perspective view of the top plate forming a part of the attachment shown in Fig. 34.

Fig. 26 illustrates still another modification of a clip 195 for attaching a single sheet of paper to the post hanger shown in Figs. 17 to 21. The clip 195 is also formed of a piece of relatively stiff wire having a vertical disposed coil 196 intermediate of its ends for engagement on the finger 157 of the post hanger. The end portions of the wire, beyond the coil 96 are bent into adjacent loop portions 197 between which the single sheet of paper is gripped by one of its vertical edge portions. The coil 196 can then be engaged with the proper finger 157 connecting the clip 195 to the post hanger.

Figs. 27 and 28 illustrate still another type of clip 198 for mounting booklets in position on the post hanger illustrated in Figs. 17 to 21. The clip 198 is formed of a U-shaped piece of stiff wire and has its intermediate arm formed with a vertically disposed coil 199 for engagement with one of the fingers 157 of the post hanger. The end portions 200 of the side arms, see Fig. 27, are bent toward each other and pointed to be pressed into the front and back faces of the booklet. Thus, the end portions 200 connect the clip 198 to the booklet and the coil 199 can then be engaged upon the respective finger 157 of the post hanger.

In Fig. 29 there is illustrated a clip 198' which closely resembles the clip 198 shown in Figs. 27 and 28 and which can be used for filing booklets. The clip 198' differs from the clip 198 only in that the intermediate arm thereof is not formed with a coil for engaging the finger 157 of the post hanger. The clip 198' is positioned on the booklet with the back edge of the booklet spaced slightly from the intermediate arm of the clip 198' so that the finger 157 of the post hanger can be engaged in the space between the back edge of the booklet and the intermediate arm.

In other respects, the clip shown in Fig. 29 is similar to that shown in Figs. 27 and 28 and like reference numerals identify like parts.

Figs. 30 and 31 illustrate another modified type of clip 201 which can be used with the post hanger shown in Figs. 17 to 21 for filing booklets or stacks of related sheets which have holes punched along their one vertical edge. The clip 201 is formed of a U-shaped piece of wire and has its intermediate arm formed with a vertically disposed coil 202 for engagement with one of the fingers 157 of the post hanger. One side arm of the clip 201 is formed closely adjacent its free end with a closed loop 203, see Fig. 31. The other side arm has its free end portion 204 bent to extend through the loop 203 with its free end pointed. In using the clip 201, the end portion 204 is disengaged from the loop 203 and passed through a desired hole punched in the article to be filed and then reengaged with the loop 203 closing the clip so that the article cannot slip off the end portion 204. That connects the clip 201 to the article to be filed and the coil 202 can then be engaged with the desired finger 157 of the post hanger.

To insure that the free end of the end portion 204 is not accidentally withdrawn from the loop 203 after an article has been engaged in position on that end portion, the free end of that end portion can be bent flat against the outer face of the side arm formed with the loop 203, if desired.

Fig. 32 illustrates another type of clip 205 which is to be used for mounting individual punched sheets on the post hanger illustrated in Figs. 17 to 21. The clip 205 is formed of a flat narrow piece of metal bent into a U-shape with its intermediate arm bent into a circular portion 206 for engagement with one of the fingers 157 of the post hanger. The end portions 207 of the side arms of the clip 205 are rounded to be passed through holes punched in the article to be filed from one side thereof. After being bent to pass through the punched holes of the article, the end portions 207 are then bent in opposite directions on the other side of the article securely attaching the clip 205 to the article. The circular portion 206 can then be engaged with the proper finger 157 of the post hanger.

A spring clip 208, see Fig. 33, is also provided for attaching any desired type of article to the post hanger shown in Figs. 17 to 21. The spring clip 208 is formed of adjacent pieces of metal 209 and 210 having pairs of lugs 211 directed toward one another. A pin 212 is passed through the lugs 211 pivotally connecting the pieces of metal 209 and 210 to each other. Adjacent ends of the pieces of metal 209 and 210 are formed with gripping jaws 213 having teeth 214 for gripping the edge portion of the article to be filed. Mounted on the pivot pin 212, but not shown on the drawings, is the usual coil spring which urges the pieces of metal 209 and 210 into positions in which the gripping jaws 213 contact one another. The other end of the piece of metal 210 is formed with a tubular extension 215 for engagement with one of the fingers 157 of the post hanger.

Figs. 34 to 37, inclusive, illustrate an attaching member 216 for connecting a single sheet of paper 217 to the post hanger shown in Figs. 17 to 21. The attaching member 216 is comprised of a base plate 218 of an elongated piece of thin metal having spaced flexible wires 219 secured to one face thereof. The wires 219 are welded to the face of the base plate 218 at one end thereof. Projections 220 are extended laterally from the back edge of the base plate 218 and are bent into curled portions to be engaged with the fingers 157 of the post hanger. The attaching member 216 further includes a top plate 221 of an elongated piece of thin metal formed with spaced holes 222 for the passage of the free ends of the wires 219. There is slidably mounted on the top plate 221, for each of the wires 219, a collar 223 beneath which the free end of the wires 219 are to be engaged, after being passed through the holes 222, for connecting the plates 218 and 221 together.

The back edge portion of the sheet of paper 217 is formed with spaced L-shaped slots 224 which open to the back edge of the sheet of paper 217 so that when the plates 218 and 221 are spaced slightly, the back edge portion of the sheet of paper can be slipped into position between the adjacent faces of the plates with the wires 219 engaged in the slots 224. The free ends of the wires 219 can then be pulled tight beneath the collars 223 drawing the plates 218 and 221 into frictional contact with the faces of the sheet of paper 217 retaining the same securely in position between the plates 218 and 221. The projections 220 can then be engaged with the fingers 157 of the post hanger completing the attachment of the sheet of paper 217 to the post hanger.

Figure 38:
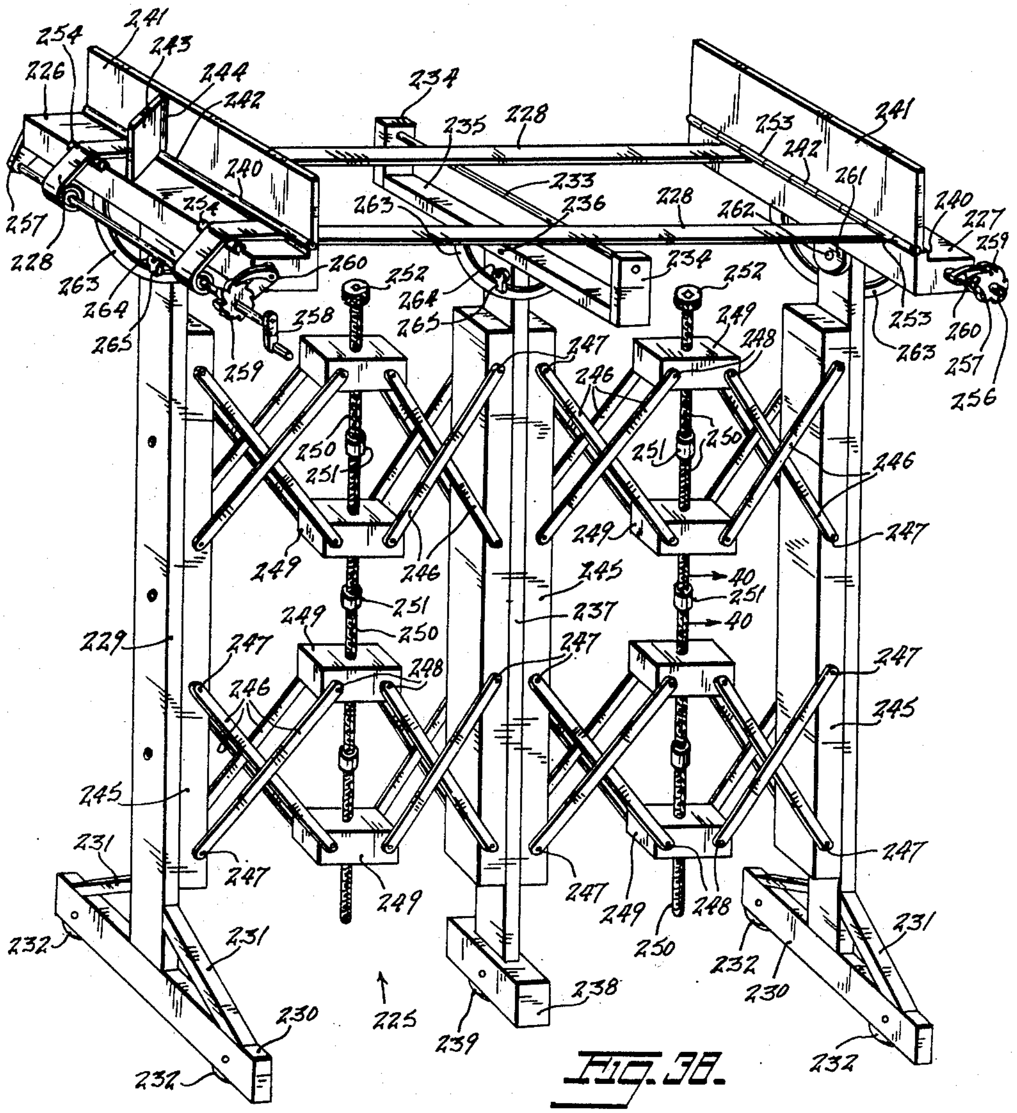
Fig. 38 is a perspective view of the filing device in the form of a stand constructed in accordance with the present invention.
Figure 40:
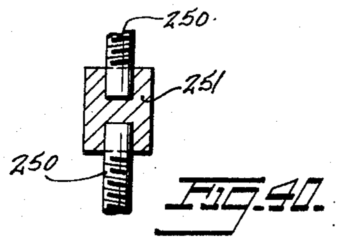
Fig. 40 is an enlarged partial vertical sectional view taken on the line 40—40 of Fig. 38.
Figures 39, 41, 42:
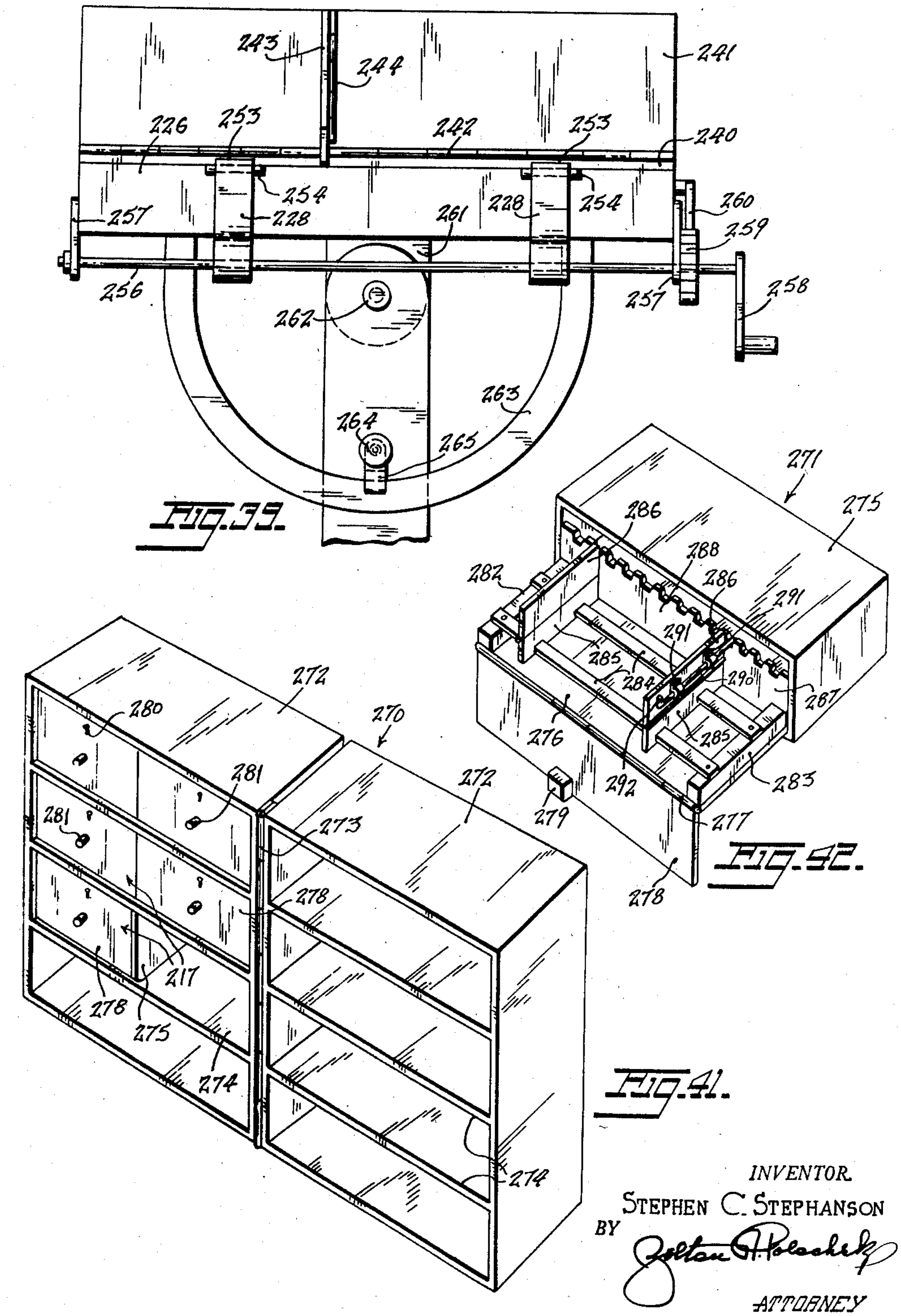
Fig. 39 is an enlarged detailed elevational view of one end of the stand shown in Fig. 38 at the top thereof.
Fig. 41 is a perspective view of the filing device in the form of a cabinet constructed in accordance with the present invention.
Fig. 42 is a perspective view of one of the filing boxes used in the form of the invention shown in Fig. 41, but in its open condition.

In Figs. 38 to 40, inclusive, there is illustrated a modification of the filing device in the form of a stand 225 having end supports in the form of spaced elongated blocks 226 and 227 between which the flexible straps 228 are stretched. It is appreciated, of course, that the stand 225 is to be used with the post hangers illustrated in Figs. 17 to 21, with any of the clips illustrated in Figs. 22 and 24 to 37 depending upon the nature of the articles to be filed and with the partition sheets 170 illustrated in Figs. 15 and 16.

Each of the blocks 226 and 227 is mounted horizontally on the top end of a vertically extended column 229. A foot member 230 is mounted horizontally in position across the bottom of each of the columns parallel with the elongated block 226 or 227. The attachment of the foot members 230 to the bottom ends of the columns 229 is reinforced by means of braces 231 and the foot members are provided with wheels 232 by which the stand 225 can be conveniently rolled across the floor.

The flexible straps 228 are supported intermediate of their ends by being rested on a rod 233 mounted at its ends upon standards 234 which are extended vertically from the ends of a horizontal beam 235. The beam 235 is pivotally mounted intermediate of its ends, by means of a pivot pin 236, upon the top end of a vertical post 237. The post 237 is located midway between the columns 229 and has an enlarged block 238 mounted on its bottom end. The block 238 also carried a wheel 239 for rolling on the floor.

The top faces of the blocks 226 and 227 at the inner edges thereof, are formed with upwardly extended flanges 240 to the top edges of which the bottom edges of support plates 241 are pivotally attached by hinge assemblies 242. Leaf-like plates 243 are pivotally attached to the outer faces of the support plates 241 by means of hinge assemblies 244 for maintaining the support plates 241 in the vertically raised position illustrated on the drawings. In their vertically raised positions, the support plates maintain the filed articles mounted on the straps 228 in adjacent vertical positions on the straps. When it is desired to free the filed articles to be leafed through, the leaf-like plates 243 are pivoted into position flat against the support plates 241 and the support plates 241 are then pivoted down onto the top faces of the elongated blocks 226 and 227. In that latter position of the support plates 241, the filed articles are free to be leafed through while mounted in position on the straps 228.

Means is provided for moving the columns 229 laterally away from or toward the post 237 to vary the operative lengths of the straps 228 between the blocks 226 and 227. The moving means is characterized by vertical disposed plates 245 mounted on the inner faces of the columns 229 and on both faces of the post 237. Between each adjacent pair of plates 245 there are lazy tong constructions including horizontally aligned pairs of crossed links 246. The outer ends of the links 246 are pivotally connected to the plates 245 by means of pins 247. The adjacent inner ends of the links 246 are pivotally connected by means of pivot pins 248 to opposite ends of horizontally disposed blocks constituting connector members 249. The connector members 249 are arranged in superimposed pairs with one pair for each of the horizontally aligned pairs of crossed links 246.

All of the connector members 249 between each pair of plates 245 are threaded onto a vertical rod formed of end aligned sections 250 which have their adjacent ends connected together by being welded into collars 251, as shown most clearly in Fig. 40. Each of the sections 250 is provided with a thread of opposite hand matching the thread in the respective connector member 249 so that as the vertical rods are turned in one direction or the other the connector members will be moved together or apart depending upon the direction of rotation. Knurled knobs 252 are mounted on the top ends of the topmost sections 250 of the vertical rods by which a grip may be had for turning the vertical rods in one direction or the other, as required to move the columns 229 outward or to draw them inward.

Each of the blocks 226 or 227 carries a manually operable means for drawing the straps 228 taut in all of the adjusted positions of the blocks 226 and 227 with relation to each other. The end portions of the straps 228 are extended through holes 253 formed in the flanges 240 below the hinge assemblies 242. The ends of the straps 228 after passing through the holes 253 are extended across rollers 254 rotatively positioned at the outer corners of the top faces of the blocks 226 and 227. From the rollers 254, the free ends of the straps 228 are extended downward along the outer faces of the blocks 226 and 227 and securely attached to rods 256. The rods 256 are rotatively supported in brackets 257 secured to the front and rear ends of the blocks 226 and 227. The front end of each rod 256 is projected a considerable distance beyond its respective bracket 257 and carries a crank handle 258. The crank handles 258 provide means by which the rods 256 can be turned in one direction or the other for causing the ends of the straps 228 to be wound on or unwound from the rods 256. Arranged in connection with the rods 256 there is provided means for holding the rods in positions in which the straps 228 will be tightly stretched between the blocks 226 and 227. The holding means is characterized by a ratchet wheel 259 mounted on each of the rods 256 between its frontmost bracket 257 and its crank handle 258. Pivotally mounted on the ends of the blocks 226 and 227 there are pawls 260 for engaging the teeth of the ratchet wheels 259 for holding the rods 256 in stationary positions in which the straps 228 are pulled tightly between the blocks 226 and 227. When adjustments of the straps 228 are to be effected, it is merely necessary to pivot the pawls 260 out of engagement with the ratchet wheels 259 freeing one or both of the rods 256 to be turned in one direction or the other.

The mounting of the blocks 226 and 227 upon the top ends of the columns 229 is a pivotal one and is accomplished by means of a depending extension 61 on each of the blocks, intermediate of their ends and which extensions overlap the top ends of the columns 229.

Pivot pins 262 are extended through the top ends of the columns 229 and the depending extensions 261 pivotally mounting the blocks 226 and 227.

Means is provided for retaining the blocks 226 and 227 and the beam 235 is desired pivoted inclined positions on the top ends of the columns 229 and the post 237 for inclining the material filed on the straps 228 to be conveniently read by one standing or sitting in front of the stand 225. The retaining means is characterized by an arcuate member 263 fixedly mounted on the bottom face of each of the blocks 226 or 227 and of the beam 235 immediately adjacent one face of the column 229 or the post 237. The arcuate members 263 are arranged concentric with the pivot pins 262 and the respective column 229 or post 237 has threaded therein a hand screw 264. Each of the hand screws 264 carried a freely rotative clamp piece 265 which is tightened against the face of the arcuate member 263 as the hand screw 264 is tightened. That in turn frictionally presses the arcuate members 263 against the respective faces of the columns 229 or the post 237 securely holding the blocks 226 and 227 and the beam 235 in the desired inclined positions.

Another modified form of the filing device is illustrated in Figs. 41 and 42 which is in the form of a cabinet 270 housing a plurality of individual filing boxes 271.

The cabinet 270 is comprised of two like half sections 272 having adjacent open sides and pivotally connected together by a piano-type hinge 273. In Fig. 41, the cabinet 270 is shown in its open position and, it is apparent, that half sections can be swung about the hinge 273 into a position in which the open sides of the sections 272 close one another. If desired, the bottom walls of the half sections 272 can be provided with rollers, not shown, to facilitate the closing of the cabinet 270 and the movement of the cabinet from one place to another.

Interiorly, the sections 272 of the cabinet 270 are provided with a plurality of equally spaced shelves 274 upon which the individual file boxes 271 are to be placed. As shown in Figs. 41, there are two file boxes on each shelf 274.

Each of the file boxes 271 is alike in construction and the constructional details of one of those boxes is illustrated in Fig. 42. As illustrated, each filing box 271 includes a container 275 constructed of wood or metal and having only its front side open. A flat base plate 276 is slidably positioned on the bottom wall of the container 275 to be slid into and out of the open front side thereof. If desired, the base plate 276 can be provided with a suitable means for retaining the same against complete disengagement from within the container 275 while permitting free sliding to the extreme extended position shown in Fig. 42. Pivotally mounted on the front edge of the base plate 276, by means of a paino-type hinge 277, there is a front cover 278 for closing the open front side of the container 275 when the base plate 276 is completely pressed into the container 275. Mounted on the inner face of the front cover 278 adjacent the top edge thereof, there is a spring pressed latch 279 engageable with a complementary keeper, not shown, on the top wall of the container 275 for holding the front cover in its closed position. The latch 279 has an operator stem 280, see Fig. 41, extended to the front face of the cover 278 by which the latch 279 can be released freeing the front cover to be pivoted to an open position. Also, mounted on the outer or front face of the cover 278, there is a small knob 281 by which a grip can be had on the file box 271 to pull it from its position within one of the half sections 272 of the cabinet 270.

Fixedly mounted on the sides of the base plate 276 there are end supports in the form of blocks 282 and 283 between which straps 284 are stretched. The straps 284 in this form of the invention are in the form of rigid lengths of wood or metal having their ends secured to the top faces of the blocks 282 and 283. As in the case of the stand-type filing device illustrated in Figs. 38 to 40, inclusive, the straps 284 are to have mounted thereon the post hangers illustrated in Figs. 17 to 21 with any of the clips shown in Figs. 22 and 24 to 37, inclusive, being used to mount the articles to be filed on those post hangers and to have mounted thereon the partition sheets 170 illustrated in Figs. 15 and 16.

Positioned on the straps 284 inward of the blocks 282 and 283, there is means for controlling the operative lengths of the straps 284 in accordance with the number of articles filed in any one of the file boxes 271. The means is characterized by a spaced pair of vertical plates 285 each of which is formed with a spaced pair of holes through which the straps 284 pass for slidably positioning the plates on the straps for free movement along the lengths of the straps. Pivotally mounted on the top edges of the plates 285 there are upstanding wings 286.

Means is provided for holding the wings 286 in their upstanding positions and for retaining the plates 285 in desired shifted positions along the lengths of the straps 284. The holding means is characterized by a vertical wall member 287 which is mounted along the back edge of the base plate 276 and which is formed along its top edge with a plurality of spaced teeth 288. Rods 290 are extended horizontally along the outer faces of the wings 286 and are slidably supported for axial movement by means of brackets 291 fixedly mounted on the outer faces of the wings 286. The ends 292 of the rods 290 remote from the wall member 287 are turned at right angles to the lengths of the rods providing a grip by which the rods 290 can be slid in one direction or the other to engage and disengage the other ends of the rods with the teeth 288.

When the rods 290 are engaged with the teeth 288, as shown in Fig. 42, the plates 285 will be retained in fixed positions on the straps 284 and the wings 286 will be retained in their upright positions retaining the filed articles in vertical positions on the straps and between the wings 286. However, when the rods 290 are pulled outward disengaging their inner ends from the teeth 288, the wings 286 can be pivoted outward and downward freeing the filed articles to be leafed through. Simultaneously, the plates 285 are freed to be slid along the lengths of the straps 284 for varying the operative lengths of the straps 284 between the plates 285.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A filing stand comprising a central upright post adapted to stand on a supporting surface, end upright columns adapted to stand on a supporting surface and being spaced from the central upright post and movable toward and away therefrom, elongated blocks extending across the tops of the end upright columns and being pivotally secured thereto, a rod extending across the central upright post and being pivotally connected thereto, horizontally disposed flexible straps stretched across the ends of the blocks and rod and being secured to the end blocks, said straps being adapted to receive post hangers for attachment of articles to be filed, means for adjusting the tension of the straps, upright plates hinged to the blocks on the end upright columns, and means for moving the end upright columns toward and away from the central upright post.

2. A filing stand as defined in claim 1 wherein the tension adjusting means includes shafts journalled on the blocks on the end upright columns, the ends of the straps being coiled around and secured to said shafts, and a handle on the end of one shaft for rotating the shafts.

3. A filing stand as defined in claim 1 wherein the means for moving the end upright columns includes lazy tong constructions connecting the central upright post and the end upright columns, each construction consisting of superimposed assemblies of links and blocks therebetween, said latter blocks having central threaded openings therethrough, and vertically disposed threaded shafts extending through the blocks of the assemblies whereby upon turning of the shafts the end upright columns are moved.

4. A filing stand comprising a central upright, post, end upright columns spaced therefrom and movable toward and away from the central upright post, elongated blocks extending across the tops of the end upright columns and pivotally secured thereto, a rod extending across the central upright post, horizontally disposed flexible straps stretched across the ends of the blocks and rod, said straps being adapted to receive post hangers for attachment of articles to be filed, upright plate hinged to the blocks on the end upright members, means for releasably holding said upright plates in vertical position, and means for moving the end upright columns toward and away from the central post.

5. A filing stand as defined in claim 4 wherein the releasable holding means includes a leaf-like plate hinged to one face of each upright hinged plates intermediate its ends and adapted to be swung across the top surface of the adjacent block for holding its upright hinged plate against collapse and adapted to be swung against said face for collapsing the upright hinged plate.

References Cited in the file of this patent

UNITED STATES PATENTS

| | | |
|---|---|---|
| 401,909 | Schonacker | Apr. 23, 1889 |
| 779,950 | MacLachlan | Jan. 10, 1905 |
| 860,885 | Proudfit | July 25, 1907 |
| 945,845 | Hofstetter | Jan. 11, 1910 |
| 995,442 | Dann | June 20, 1911 |
| 1,072,919 | Crozier | Sept. 9, 1913 |
| 1,202,345 | Wigginton | Oct. 24, 1916 |
| 1,355,629 | Viollet | Oct. 12, 1920 |
| 1,359,990 | Higdon | Nov. 23, 1920 |
| 1,445,179 | Seymour | Feb. 3, 1923 |
| 1,587,447 | Von Auw et al. | June 1, 1926 |
| 1,654,555 | Picard | Jan. 3, 1928 |
| 1,835,381 | Collantes | Dec. 8, 1931 |
| 2,508,802 | Schade | May 23, 1950 |
| 2,546,419 | Ashley | Mar. 27, 1951 |